United States Patent [19]

Sugawara et al.

[11] Patent Number: 5,148,343
[45] Date of Patent: Sep. 15, 1992

[54] MAGNETIC HEAD WITH CONTACT GAP

[75] Inventors: Naoto Sugawara, Fukushima; Yoichi Muratomi, Hyogo, both of Japan

[73] Assignee: Mitsubishi Denki Kabushiki Kaisha, Japan

[21] Appl. No.: 490,763

[22] Filed: Mar. 8, 1990

[30] Foreign Application Priority Data

Mar. 10, 1989 [JP] Japan ................... 1-58845

[51] Int. Cl.$^5$ ................... G11B 5/60; G11B 5/265; G11B 5/187; G11B 5/127
[52] U.S. Cl. ................... 360/122; 360/103; 360/121; 360/125
[58] Field of Search ............ 360/103, 122, 125, 126, 360/121, 104

[56] References Cited

U.S. PATENT DOCUMENTS

| 4,321,641 | 3/1982 | Lee ........................ 360/126 |
| 4,387,410 | 6/1983 | Takanohashi et al. ........... 360/125 |
| 4,635,153 | 1/1987 | Shimamura et al. ............ 360/122 |
| 4,638,391 | 1/1987 | Hatanai et al. ............... 360/122 |
| 4,745,507 | 5/1988 | Otomo et al. ................ 360/125 |
| 4,748,527 | 5/1988 | Fujioka et al. ............... 360/121 |
| 4,809,112 | 2/1989 | Noguchi et al. ............... 360/125 |
| 4,939,608 | 7/1990 | Okamura et al. ............... 360/125 |

FOREIGN PATENT DOCUMENTS

| 62-77408 | 5/1987 | Japan . |
| 62-102406 | 5/1987 | Japan . |
| 62-234208 | 10/1987 | Japan . |
| 63-175210 | 7/1988 | Japan ................... 360/125 |

Primary Examiner—Aristotelis Psitos
Assistant Examiner—Jefferson Evans
Attorney, Agent, or Firm—Wolf, Greenfield & Sacks

[57] ABSTRACT

A magnetic head includes a head core having a top surface with a magnetic gap for contact with a magnetic record medium and a pair of sections of a laminar slider bonded onto the top of the head core such that their top surface is flush with the core top surface to form a slider surface, thereby eliminating any sliders which have been bonded to sides of the head core.

20 Claims, 4 Drawing Sheets

MAGNETIC HEAD WITH CONTACT GAP

BACKGROUND OF THE INVENTION

Field of the Invention

The present invention relates to improvements in the slider surface of a magnetic head for contact with a magnetic record medium.

Description of the Prior Art

A conventional magnetic head slider for a magnetic head is shown in FIG. 5. A head core 3 is bonded between the first and second slider sections 20 and 30. An exploded view of the head slider is given in FIG. 6. The top surface of each slider section 20 or 30 is polished to form a slider surface 1a or 2a for sliding contact with a magnetic record medium. Each slider surface 1a or 2a has a circular rim 1b or 2b.

In FIG. 7, the first and second sliders 4 and 5, which are made identical with that of FIG. 5, are supported by gimbal springs 7 and 8 which are able to yield in every direction such that the slider surfaces 1a and 2a are brought into contact with a magnetic record medium 6. Each head core 3 is provided with a coil 9.

In operation, when an information signal is recorded or reproduced, the first and second sliders 4 and 5 are brought into contact with the opposite surfaces of the rotating medium 6 by the gimbal springs 7 and 8 so that each head core 3 is prevented by the slider sections 20 and 30 on opposite sides thereof from being worn away by friction.

In the above magnetic head, however, the slider surfaces 1a and 2a can fail to faithfully follow the record medium 6 because of a difference in form after polishing. In addition, the head core 3 is bonded between the slider sections 20 and 30 so that stresses are applied to opposite sides of the head core 30, resulting in not only the degraded electromagnetic characteristics but also the increased number of manufacturing steps.

SUMMARY OF THE INVENTION

Accordingly, it is an object of the present invention to provide a magnetic head which is free of the above problem.

According to the invention the above object is achieved by a magnetic head which includes a head core having a top surface with a magnetic gap for contact with a magnetic record medium; and a laminar slider provided on top of the head core such that its top surface is flush with the top surface of the head core to form a slider surface.

The above and other objects, features, and advantages of the invention will become more apparent from the following description when taken in conjunction with the accompanying drawing.

DESCRIPTION OF THE PREFERRED EMBODIMENT

Figure 1:
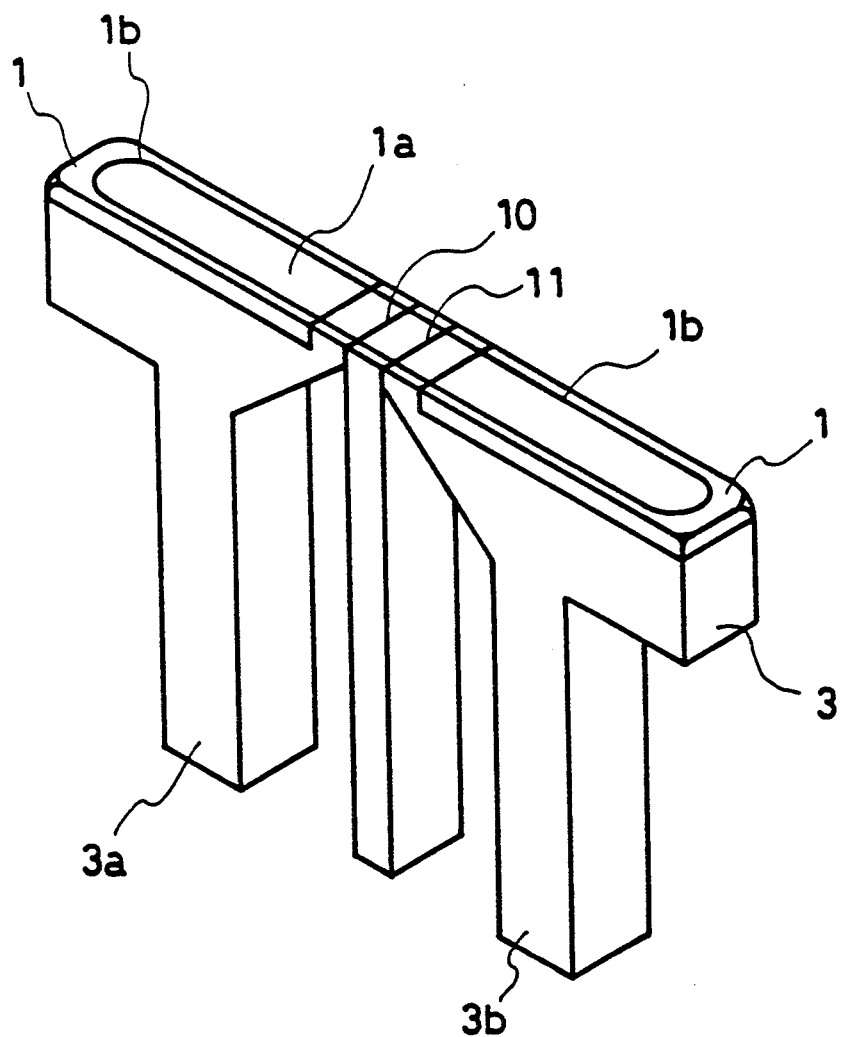
FIG. 1 is a perspective view of the essential part of a magnetic head according to an embodiment of the invention.

A pair of rectangular laminar sliders 1 of a predetermined length as shown in FIG. 1, are provided on top of a pair of sections of a head core 3 which are joined together, with a record/reproduction magnetic gap 10 and an erase magnetic gap 11 formed between them. A flat and smooth slider surface 1a including the magnetic gaps 10 and 11 is made by polishing the top surfaces of the laminar sliders 1 for contact with a magnetic record medium. A circular rim 1b is provided in the periphery of the slider surface 1a. The head core 3 has a pair of core legs 3a and 3b over which a record/reproduction coil and an erase coil are fitted, respectively.

Figure 2:
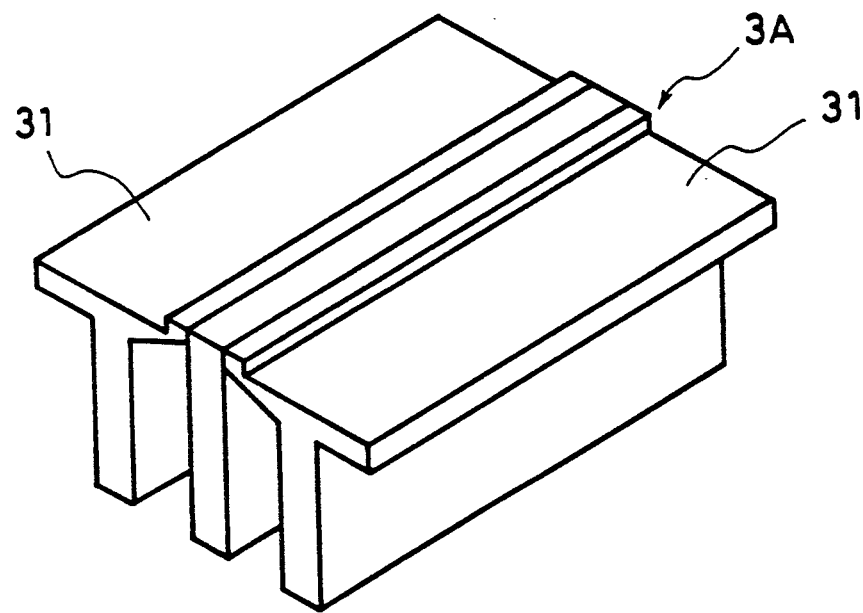
FIGS. 2 and 3 are perspective views showing how to make the magnetic head of FIG. 1.
Figure 3:
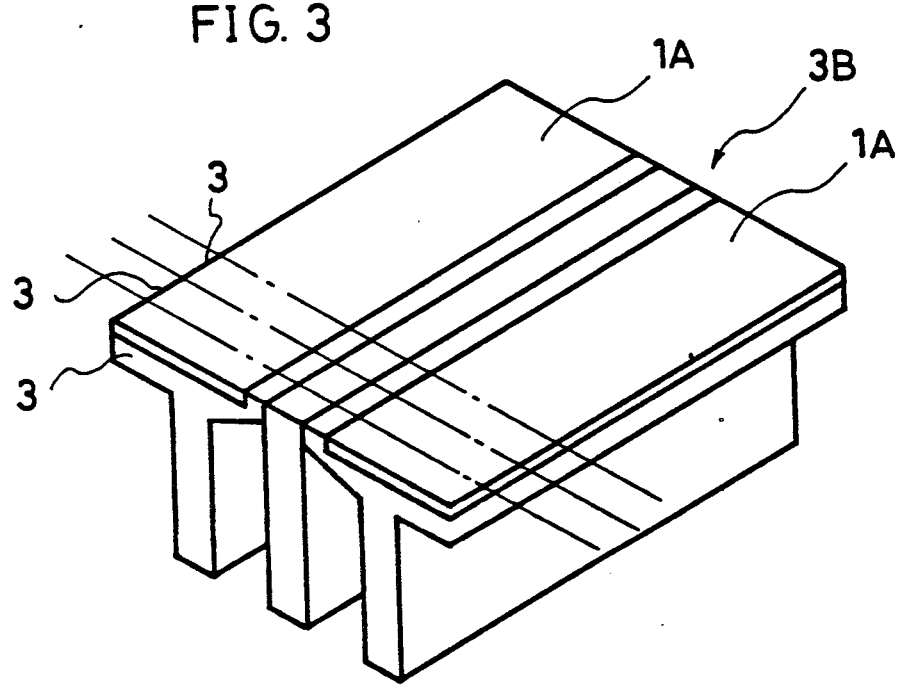

How to make the head core will be described with reference to FIGS. 2 and 3. First, as shown in FIG. 2, a pair of core sections each having a stepped top portion 31 are joined together to form a head core block 3A. Then, as shown in FIG. 3, a pair of slider plates IA are bonded onto the stepped top portions 31 to form a head core assembly 3B, which is then sliced to a predetermined thickness to provide respective head cores 3.

Figure 4:
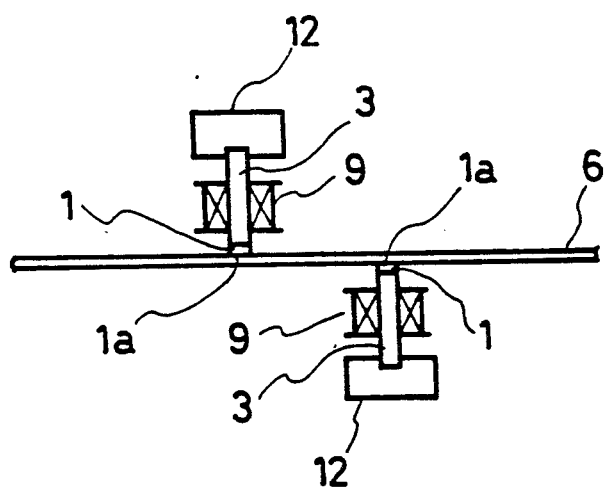
FIG. 4 is a side view of the essential part of a both-side, flexible disc drive using the magnetic head of FIG. 1.
Figure 5:
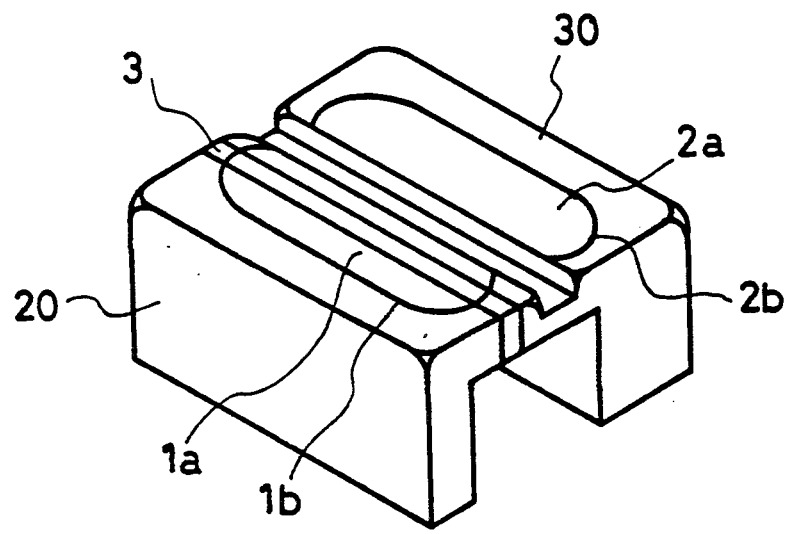
FIG. 5 is a perspective view of the essential part of a conventional head slider.
Figure 6:
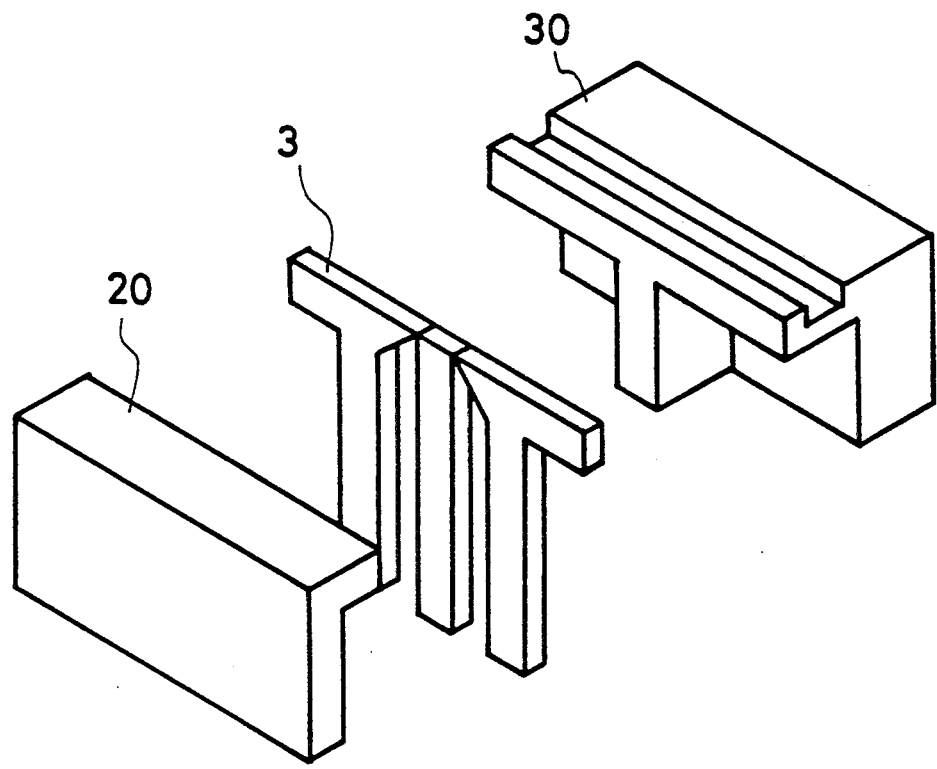
FIG. 6 is an exploded perspective view of the conventional head slider.
Figure 7:
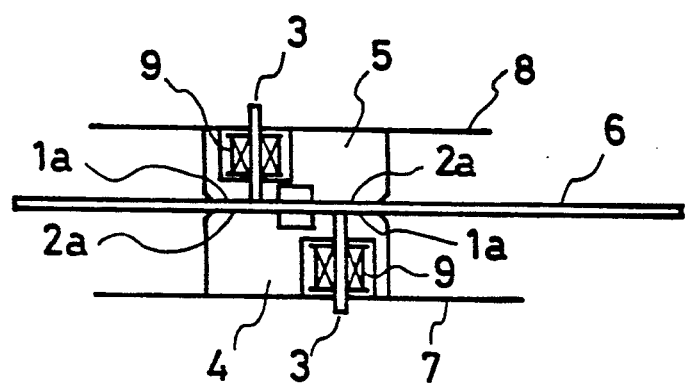
FIG. 7 is a side view of the essential part of a conventional flexible disc drive.

In FIG. 4, a magnetic record medium 6 is in contact with the slider surfaces 1a, which includes the magnetic gaps 10 and 11, of a pair of head cores 3. A pair of head core holders 12 are provided to support the head cores 3 each provided with a coil 9. In summary, according to the invention, it is only the head core that slides on the magnetic record medium.

In addition, as shown in FIG. 1, both sides of the head core are visible so that it is possible to polish its top surface while measuring the depth of the magnetic gaps, thus preventing too much polishing which lowers the characteristics of the magnetic head.

Moreover, since there are no first and second slider sections 20 and 30 as shown in FIG. 4, it is easy to fit respective coils 9 over the head core 3.

Alternatively, the width of the laminar slider 1 may be slightly greater or less than the thickness of the head core 3. Only part of the slider surface 1a adjacent the record/reproduction magnetic gap 10 and the erase magnetic gap 11 may be made in the same plane as the magnetic gaps 10 and 11.

According to the invention, no stresses are applied to opposite sides of the head core, otherwise applied by the bonded sliders. In addition, the depth of the magnetic gaps is controlled with higher precision than ever before, thus not only making possible mass production of the head cores with stable characteristics but also reducing the number of process steps for assembling the head cores.

We claim:

1. A magnetic head comprising:
    a head core having a top surface defining a raised central portion with a substantially flat contact surface for contact with a moving magnetic record medium and the raised central portion including two magnetic gaps and being divided transversely to a direction of magnetic record medium motion by the magnetic gaps;
    the top surface further defining a pair of stepped top portions each having a surface that is recessed relative to the contact surface of the raised central portion and that is substantially parallel thereto, the stepped top portions being upon opposing sides of the raised central portion and extending therefrom along the direction of magnetic record medium motion and the stepped top portions being remote from the magnetic gaps;

a pair of legs projecting opposite and remote from the top surface and integrally formed with the head core, the legs having free ends remote from the magnetic gaps and the legs being separated from each other along a major length thereof, the legs being spaced along the major length at a distance that is equal to or greater than the length of three raised central portion along a direction of magnetic medium motion;

a third core leg disposed between said pair of legs and defining therewith said two magnetic gaps; and a pair of sections of an abrasion resistant laminar slider provided on the surface of each of the stepped top portions such that magnetic record medium contact surfaces of the laminar slider sections are flush with and parallel to the contact surface of the raised central portion to form a slider surface.

2. The magnetic head of claim 1, wherein said slider sections have a width which is equal to a thickness of said head core.

3. A magnetic head comprising:

a head core including a top surface having at least one magnetic gap for contact with a moving record medium, the top surface defining a raised central portion having a length L in a direction parallel to a direction of record medium motion and the raised central portion being divided by the magnetic gap transversely to the length;

the top surface further defining a pair of recessed stepped top portions each having a surface parallel to a contact surface of the raised central portion and each of the stepped top portions being remote from the magnetic gap and extending in opposite directions from the raised central portion along the direction of record medium motion;

at least two core legs projecting opposite and remote from the top surface nd the core legs being integral with the head core, the core legs each having a free end remote from the magnetic gap and separated form the gap over a major length thereof, the core legs being spaced from each other along the major length of each by a distance no less than the length L; and a pair of sections of a laminar slider positioned on the surface of each of the stepped top portions such that magnetic record medium contact surfaces of the laminar slider sections are flush with ana parallel of the contact surface of the raised central portion to form a slider surface.

4. The magnetic head of claim 3 wherein the raised upper portion of said head core includes two magnetic gaps.

5. A magnetic head comprising:

a head core including a top surface having two magnetic gaps for contact with a moving record medium, the top surface defining a raised central potion having a length in a direction parallel to a direction of record medium motion and the raised central portion being divided by the magnetic gaps transversely to the length;

the top surface further defining a pair of stepped top portions reach having a surface parallel to a contact surface of the raised central portion and each of stepped top portions being remote for the magnetic gaps and extending in opposite directions from the raised central portion relative to the direction of record medium motion;

at least two core legs projecting opposite and remote from the top surface and the core legs being integral with the head core, the core legs each having a free end remote from the magnetic gaps and separated from the gaps over a major length thereof, the legs being spaced from each other along the major length by a distance that is equal or greater than the length of the raised central portion;

a third core leg disposed between and defining said two magnetic gaps, an end of third core leg proximate the top surface being flush with the contact surface of the raised central portion and the third core leg projecting parallel to each of the core legs and being spaced form each of the core legs along a major length thereof sufficient to allow fitting of a magnetic coil over either of the core legs; and a pair of sections of a laminar slider positioned on the surface of each of the stepped top portions such that magnetic record medium contact surfaces of the laminar slider sections are flush with and parallel to the contact surface of the raised central portion to form a slider surface.

6. The magnetic head of claim 5 wherein said first and second core legs each include one of a record/reproduction and erase coil fited over each of said first and second core legs.

7. The magnetic head of claim 3 wherein said sections of a laminar slider include upper surfaces that are polished to optimize sliding characteristics.

8. The magnetic head of claim 7 wherein said sections of a laminar slider include upper surfaces each having a circular rim within their periphery.

9. The magnetic head of claim 3 wherein said sections of a laminar slider each have a width equal to the thickness of said head core.

10. The magnetic head of claim 3 wherein the stepped top portions extend in opposing directions from the raised central portion a distance greater than a maximum spacing of the core legs along their major lengths from each other.

11. A magnetic head comprising:

a head core including a top surface having two magnetic gaps of contact with a moving record medium,. the top surface defining a raised central portion having a length in a direction parallel to a direction of record medium motion and the raised central portion being divided by the magnetic gaps transversely to the length;

the top surface further defining a pair of stepped top portions having a surface parallel to a contact surface of the raised central portion and each of the stepped top portions being remote from the magnetic gaps and extending in opposite directions from the raised central portion along the direction of record medium motion;

at least two core legs projecting opposite and remote from the top surface and the core legs being integral with a core, the core legs having a free end remote from the gaps and separated from the gaps over a major length thereof, wherein the stepped top portions extend in opposing directions from the raised central portion a distance greater than a maximum spacing of the core legs along their major lengths from each other;

a third core leg disposed between and defining the two magnetic gaps, and end of the third core leg proximate the top surface being flush with the contact surface of the raised central portion and the third core leg projecting parallel to each of the core legs and being spaced from each of the core legs along a major length thereof sufficient to allow fitting of a magnetic coil over either of the core legs; and a pair of sections of a laminar slider positioned on a surface of each of the stepped top portions such that magnetic record medium contact surfaces of the laminar slider sections are flush with and parallel to the contact surface of the raised central portion to form a slider surface.

12. The magnetic head of claim 11 wherein the core legs are substantially similar in cross section along their major lengths.

13. The magnetic head of claim 12 wherein each of the core legs are separated from each other along their major lengths at a locations in which they are perpendicular, relative to their major lengths, to the top surface at points there along that are remove from there said central portions and from opposing remote ends of the stepped top portions.

14. The magnetic head of claim 1 wherein there raised upper portion of said head core includes two magnetic gaps.

15. The magnetic head of claim 14 further comprising a third core leg disposed between and defining said two magnetic gaps, an end of the third core leg proximate the top surface being flush with the contact surface of the raised central portion and the third core legs projecting parallel to each of the legs and being spaced from each of the legs along a major length thereof sufficient to allow sliding of a magnetic oil over the free end of either of the legs to a position proximate the magnetic gaps.

16. The magnetic head of claim 15 wherein parts of the head core including the stepped top portions extend outwardly in a direction relative to the direction of magnetic record medium motion a distance greater than a maximum width of the legs taken along a direction parallel thereto so as to form a T shape between the parts of the head core and the legs.

17. A magnetic head comprising:

a head core having a top surface with two magnetic gaps for contact with a magnetic record medium, said top surface defining by a pair of record medium contact portions forming said gaps, a pair of stepped portions in said top surface disposed respectively adjacent said record medium contact portions remote from said gaps, a pair of abrasion resistant laminar slider sections received respectively by said pair of stepped portions and having the top surface of each of the laminar slider sections substantially flush with the top surface of the record medium contact portions to form a slider surface, said head core having a pair of free end legs inertial with and disposed away from the had core top surface, said legs being separated from each other along a major length thereof, the length of separation of the legs being greater than or equal to a spacing distance of the laminar slider sections from each other to allow magnetic oils or the like to be fitted over The legs.

18. A magnetic head comprising:

a head core including a top surface having two magnetic gaps for contact with record medium, said top surface defined by a pair of record medium contact portions forming said gaps, a pair of stepped portions in said top surface disposed respectively adjacent said record medium contact portions remote from said gaps, a pair of abrasion resistant laminar slider sections received respectively by said pair of said portions and having the top surface of each of the laminar slider sections substantially flush with the top surface of the record medium contact portions to form a slider surface, said head core having a pair of free end legs integral with and disposed away from the head core top surface, said legs being separated form each other along a major length thereof, wherein the spacing between the legs along the major length thereof is greater than the spacing between laminar slider sections to allow magnetic coils or the like to be fitted over the legs, and a third core leg disposed between the pair of legs and defining therebetween the two magnetic gaps, the third core leg extending parallel to and in the same direction as the pair of core legs.

19. The magnetic head of claim 18 wherein the spacing between the third core leg and either of the pair of core legs is greater than the spacing between gaps.

20. A magnetic head comprising:

a head core having a top surface with tow magnetic gaps for contact with a magnetic record medium, said top surface defined by a pair of record medium contact portions forming said gaps, a pair of stepped portions in said top surface disposed respectively adjacent said record medium contact portions remote from said gaps, a pair of abrasion resistant laminar slider sections received respectively by said pair of stepped portions and having the top surface of each of the laminar slider sections substantially flush with the top surface of the record medium contact portions to form a slider surface, said head core having a pair of free end legs integral with and disposed away from the head core top surface, said legs being separated from each other along a major length thereof to allow magnetic oils of the like to be fitted over the legs, the legs being separated from each other by a distance along their major length that is equal to or greater than a spacing of the abrasion resistant slider sections from each other.

* * * * *